United States Patent
Kim

(10) Patent No.: US 10,160,330 B2
(45) Date of Patent: Dec. 25, 2018

(54) WIND POWERED SYSTEM FOR VEHICLES

(71) Applicant: Chuil Peter Kim, Metairie, LA (US)

(72) Inventor: Chuil Peter Kim, Metairie, LA (US)

(*) Notice: Subject to any disclaimer, the term of this patent is extended or adjusted under 35 U.S.C. 154(b) by 0 days.

(21) Appl. No.: 15/345,497

(22) Filed: Nov. 7, 2016

(65) Prior Publication Data

US 2018/0126855 A1  May 10, 2018

(51) Int. Cl.
| | |
|---|---|
| *B60L 8/00* | (2006.01) |
| *F03D 9/25* | (2016.01) |
| *B60K 1/02* | (2006.01) |
| *F03D 9/32* | (2016.01) |

(52) U.S. Cl.
CPC ............ *B60L 8/006* (2013.01); *B60K 1/02* (2013.01); *F03D 9/25* (2016.05); *F03D 9/32* (2016.05); *F05B 2240/941* (2013.01); *Y02E 10/725* (2013.01); *Y02T 10/7083* (2013.01)

(58) Field of Classification Search
CPC ............ B60L 8/006; B60K 1/02; F03D 9/25
USPC .......................................... 320/101
See application file for complete search history.

(56) References Cited

U.S. PATENT DOCUMENTS

| | | | | |
|---|---|---|---|---|
| 4,254,843 A | * | 3/1981 | Han ...................... | B60K 1/00 180/165 |
| 5,296,746 A | * | 3/1994 | Burkhardt ............. | H02J 7/34 180/2.2 |
| 5,760,515 A | * | 6/1998 | Burns .................... | F03D 9/00 180/65.31 |
| 8,436,485 B1 | * | 5/2013 | Smith .................... | F03D 9/00 290/55 |
| 2002/0153178 A1 | * | 10/2002 | Limonius ............... | B60L 8/006 180/2.2 |
| 2007/0202976 A1 | * | 8/2007 | Luedtke ................. | B60K 6/48 474/70 |
| 2009/0090573 A1 | * | 4/2009 | Boone .................... | B60K 6/24 180/65.245 |
| 2012/0274068 A1 | * | 11/2012 | Hanback ................ | H02P 9/04 290/44 |
| 2017/0212005 A1 | * | 7/2017 | Walter .................... | G01M 9/04 |

* cited by examiner

*Primary Examiner* — M'Baye Diao
(74) *Attorney, Agent, or Firm* — Rabin & Berdo, P.C.

(57) ABSTRACT

Provided is a wind powered system which provides electrical energy to a vehicle using wind flow through wind tunnels. The system includes a plurality of ducts or wind tunnels each of which accommodates a plurality of rotary fans which are connected to a corresponding one of a plurality of alternators. A pulling fan and a motor connected to the pulling fan are provided to pull and move the wind throughout the ducts.

6 Claims, 2 Drawing Sheets

WIND POWERED SYSTEM FOR VEHICLES

BACKGROUND OF THE INVENTION

The present invention relates to a self-charger or wind powered system for vehicles.

SUMMARY OF THE INVENTION

According to one aspect of the invention, a self-charger or a wind powered system for an electric vehicle is provided with ducts, rotary fans and alternators. The vehicle, equipped with the wind powered system of the invention, may utilize the wind power collected through the ducts while the vehicle is parked or in motion. Wind power is received by the rotary fans connected to alternators which supply energy to the car battery. The wind powered system of the invention focuses on a consolidation of fans, alternators and motors to harness the wind power and transform it into energy that can be consumed by an automobile.

Harnessing wind energy within an automobile with the wind powered system of the invention will lead to longer travel times by non-combustible engines. Fossil fuels will be lessened which will lead to a smaller carbon footprint on Earth. On average, electric vehicles will travel anywhere from 40-100 miles on a single charge. This is in particular reference to strictly electric vehicles. If these same vehicles could also harness wind energy by the wind powered system of the invention to sustain a constant drive, it enables the vehicles to utilize two power sources at once.

An electric vehicle is propelled by electric motors using energy stored in a battery or similar device, but the electric vehicle is limited in driving distances as it is dependent on the time it has been charged and the amount of charge it has received. The wind powered system of the invention enables to further optimize the energy used by electric vehicles and to provide an additional source of energy to decrease battery depletion.

The wind powered system of the invention can also be applied to general motor vehicles as a supplementary source of power to the existing structures.

BRIEF DESCRIPTION OF THE DRAWINGS

The accompanying drawings are included to provide a further understanding of the present invention, and are incorporated in and constitute a part of this specification. The drawings illustrate exemplary embodiments of the present invention and, together with the description, serve to explain principles of the present invention. In the drawings.

DETAILED DESCRIPTION OF THE INVENTION

A semiconductor device according to the present invention will be described below in detail with reference to the accompanying drawings.

Figure 1:
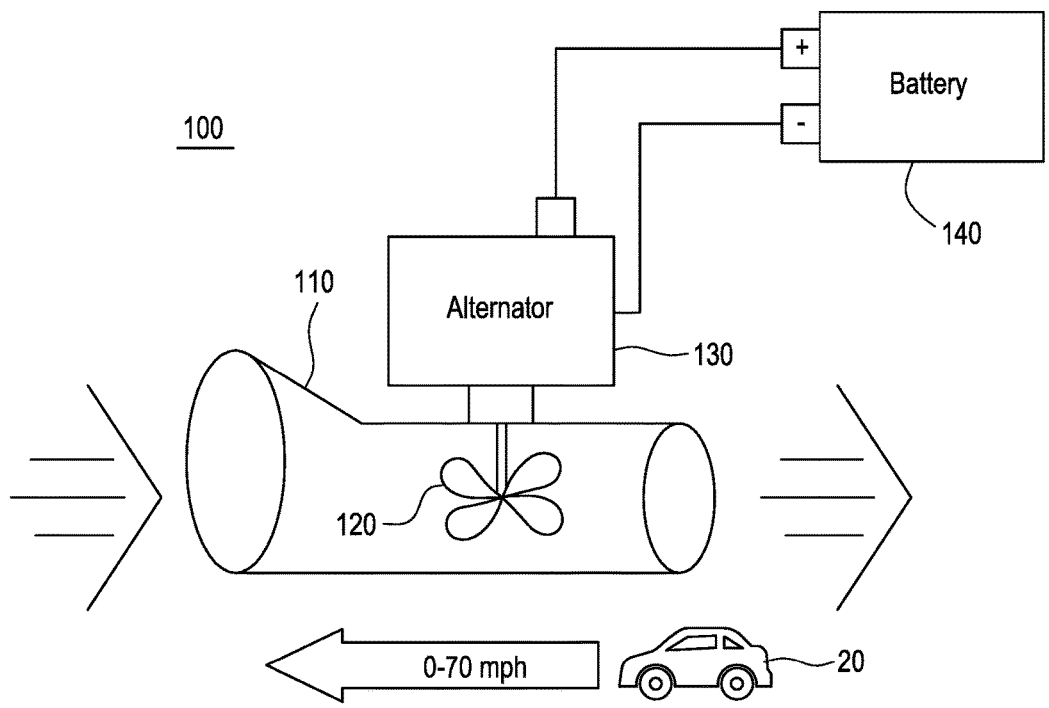
FIG. 1 shows a wind powered system located inside a body of a vehicle according to an embodiment of the present invention.
Figure 2:
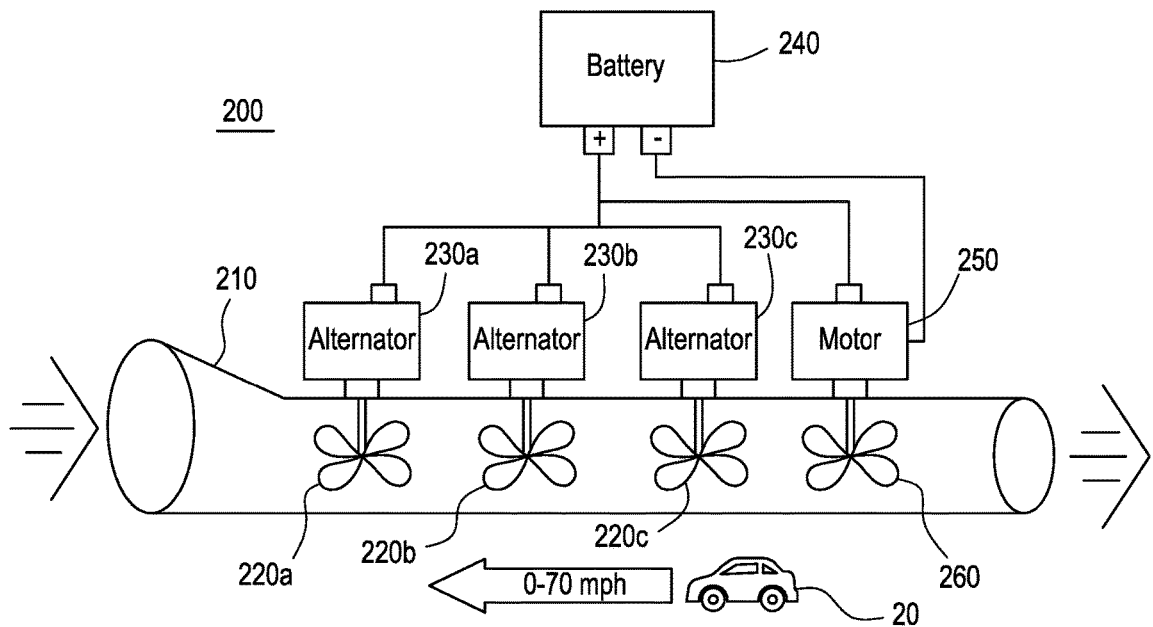
FIG. 2 shows a wind powered system located inside a body of a vehicle according to another embodiment of the present invention.

FIG. 1 illustrates a wind powered system 100 located inside a body of a car 20. Whether parked or in motion, the car 20 captures wind which passes through a wind tunnel 110. Inside the wind tunnel 110 is a rotary fan 120 that is connected to and feeds an alternator 130, which charges a battery 140 and powers an electrical system. The amount of power or electricity generated by the wind powered system 100 will be low and is not sufficient to power the car independently. However, in motor vehicles fueled by gasoline or diesel, this wind powered system can provide supplementary power for, among other things, lighting, audio system, and air conditioner of vehicles. This solution can ultimately decrease the overall battery depletion and reduce the amount of fuel consumed by the vehicles. FIG. 1 is the basic principle behind the consolidated designs of FIGS. 2, 3, and 4. FIG. 2 shows a wind powered system 200 according to another embodiment of the present invention. The system 200 includes a wind tunnel 210, a plurality of rotary fans 220a, 220b and 220c, and a plurality of alternators 230a, 230b, and 230c connected to the rotary fans 220a, 220b and 220c. In FIG. 2, for example, three rotary fans and three alternators are provided. Similar to FIG. 1, wind passes through the wind tunnel 210 and propels the rotary fans 220a, 220b and 220c which charge the alternators 230a, 230b and 230c. In most cases, the wind alone will not be able to propel all three rotary fans. A motor 250 and a pulling fan 260 are provided to pull the wind from an intake inlet of the wind tunnel 210 and move better through the wind tunnel 210, allowing all three rotary fans 220a, 220b and 220c to spin. The alternators connected to each fan will then charge the battery 240, ultimately harnessing more power than the basic structure displayed in FIG. 1.

Figure 3:
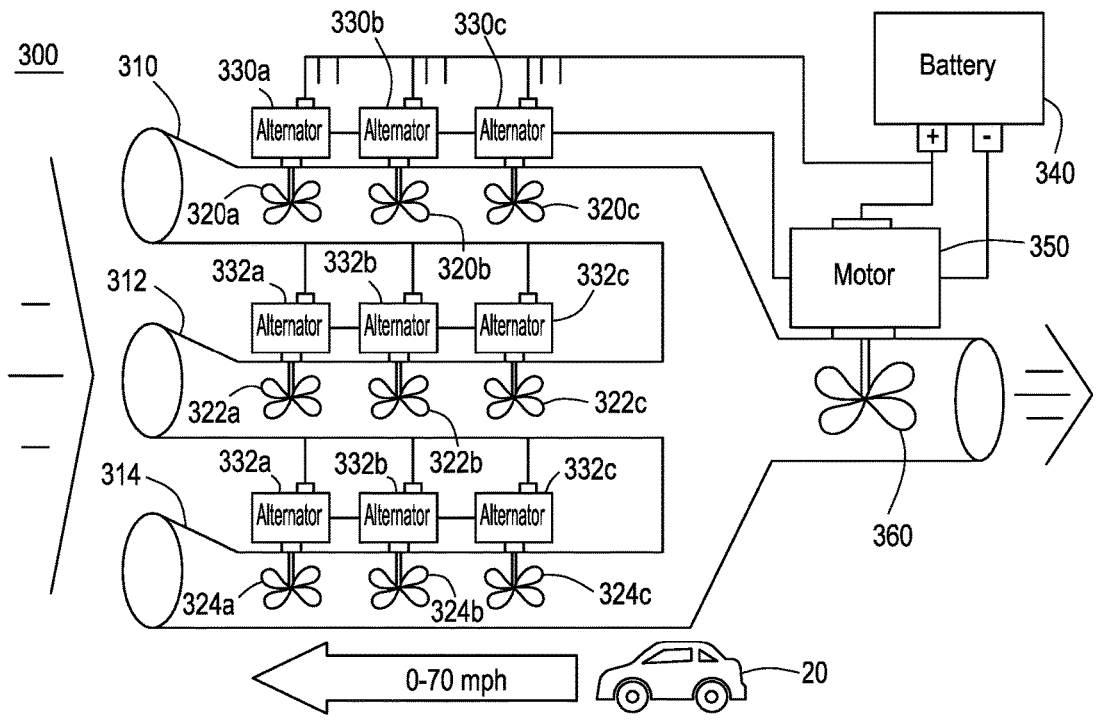
FIGS. 3 and 4 show a wind powered system located inside a body of a vehicle according to a further embodiment of the present invention, in which a plurality of wind tunnels are provided.
Figure 4:
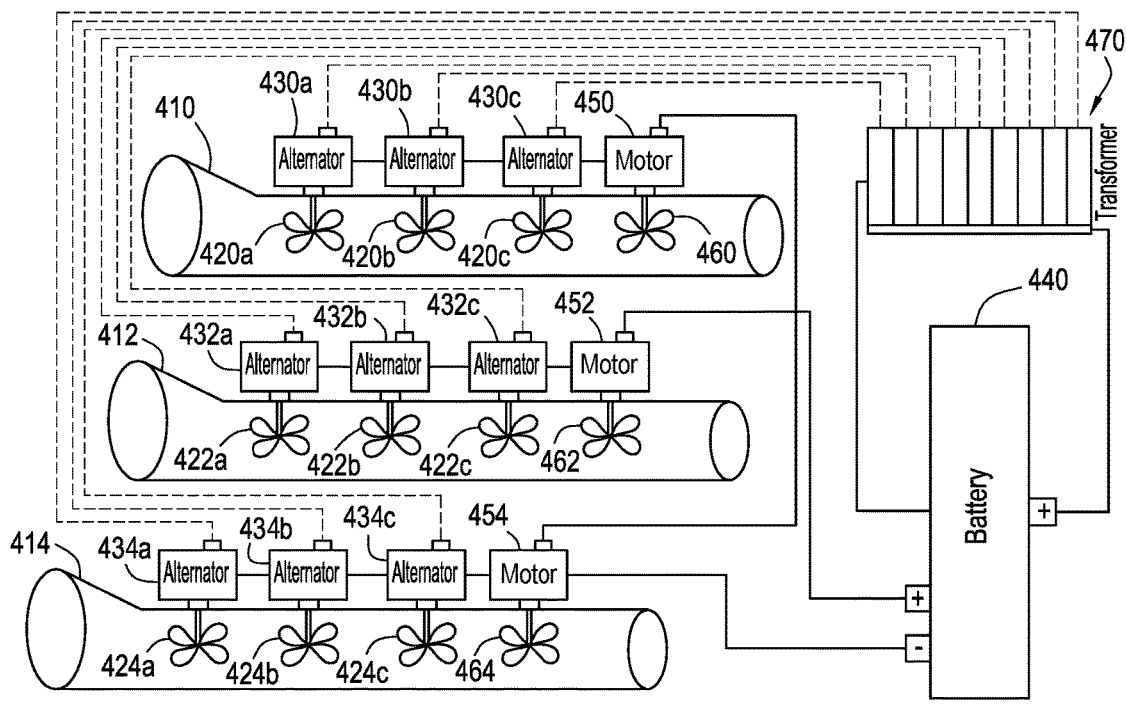

FIGS. 3 and 4 show a wind powered system according to a further embodiment of the present invention, which includes a plurality of wind tunnels. The system utilizes a plurality of rotary fans, for example, 9 rotary fans, to harness wind power and feed a plurality of alternators, for example, 9 alternators. This is a larger-scale system which requires a larger motor and fan to pull the wind forward through a plurality of wind tunnels, for example, three connected wind tunnels. The purpose of this larger-scale system is to be used in conjunction with the operating system of an electric vehicle and provide supplementary power.

A system 300 in FIG. 3 includes a plurality of wind tunnels 310, 312 and 314 in which intake inlets are separated from each other but a single outlet is shared by the plurality of the wind tunnels. A system in FIG. 4 includes plurality of wind tunnels 410, 412 and 414 separated from each other.

In each wind tunnel, a plurality of rotary fans (320a, 320b, 320c; 322a, 322b, 322c; 324a, 324b, 324c (FIG. 3) and 420a, 420b, 420c; 422a, 422b, 422c; 424a, 424b, 424c (FIG. 4)) are provided, and connected to a corresponding one of a plurality of alternators (330a, 330b, 330c; 332a, 332b, 332c; 334a, 334b, 334c (FIG. 3) and 430a, 430b, 430c; 432a, 432b, 432c; 434a, 434b, 434c (FIG. 4)). The alternators are connected to a battery 340 (FIG. 3) or 440 (FIG. 4). The rotary fans are configured to be able to charge the alternators. The battery takes converted power from the alternators and may store the same for later usage.

A motor 350 and a pulling fan 360 are provided as shown in FIG. 3. The pulling fan 360 is provided adjacent to the single outlet shared by the plurality of the wind tunnels.

A plurality of motors 450, 452 and 454, and a plurality of pulling fans 460, 462 and 464 are provided in FIG. 4. Each of the pulling fans is provided adjacent to an outlet of a respective one of the plurality of wind tunnels, and each of the motors is connected to a corresponding one of the pulling fans.

The motors as shown in FIGS. 3 and 4 may be connected to the battery 340 or 440 and designed to operate based on electrical energy and wind energy. The capacitors and alternators will have specialized designs to incorporate usages of both at any given time.

The wind powered system may further include a transformer to which the alternators are connected. As exemplarily shown in FIG. 4, the wind powered system further include a transformer 470 to which the alternators are connected. The transformer 470 is connected to the battery 440. The transformer 470 may be configured to sustain high amounts of energy in order to convert between electrical and wind energy.

The wind powered system may further include semiconductors that will help with wind power conversion.

It should be understood, however, that the invention is not necessarily limited to the specific arrangement and components shown and described above, but may be susceptible to numerous variations within the scope of the invention.

It will be apparent to one skilled in the art that the manner of making and using the claimed invention has been adequately disclosed in the above-written description of the preferred embodiments taken together with the drawings.

It will be understood that the above description of the preferred embodiments of the present invention are susceptible to various modifications, changes, and adaptations, and the same are intended to be comprehended within the meaning and range of equivalents of the appended claims.

The invention claimed is:

1. A wind powered system, comprising:
   a plurality of wind tunnels;
   a plurality of rotary fans which are provided in each wind tunnel; and
   a plurality of alternators connected to a respective one of the plurality of rotary fans,
   wherein the plurality of wind tunnels have a plurality of intake inlets which are separated and apart from each other and a single outlet shared by the plurality of wind tunnels.

2. The system of claim 1, further comprising:
   a pulling fan provided adjacent to the single outlet, and a motor connected to the pulling fan.

3. The system of claim 1, further comprising a battery connected to the plurality of alternators,
   wherein the motor is connected to the battery.

4. A wind powered system, comprising:
   a plurality of wind tunnels;
   a plurality of rotary fans which are provided in each wind tunnel; and
   a plurality of alternators connected to a respective one of the plurality of rotary fans,
   wherein the plurality of wind tunnels are separated and apart from each other,
   wherein the system further comprises:
   a plurality of pulling fans, which are respectively provided in a respective one of the plurality of wind tunnels at a position adjacent to an outlet of the respective one of the plurality of wind tunnels; and
   a plurality of motors, which are respectively connected to a respective one of the plurality of pulling fans.

5. The system of claim 4, further comprising a battery connected to the plurality of alternators,
   wherein the plurality of motor are connected to the battery.

6. The system of claim 5, further comprising a transformer connected to the plurality of alternators and further connected to the battery.

* * * * *